(12) United States Patent
Koester et al.

(10) Patent No.: US 10,859,480 B2
(45) Date of Patent: Dec. 8, 2020

(54) SYSTEM AND METHOD FOR DETERMINING LINEAR DENSITY OF CARBON FIBER

(71) Applicant: Vanderbilt University, Nashville, TN (US)

(72) Inventors: David J. Koester, Nashville, TN (US); Douglas Adams, Brentwood, TN (US); Raymond Martin Bond, Nashville, TN (US); Garrett W. Thorne, Nashville, TN (US); Janette Jaques Meyer, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 520 days.

(21) Appl. No.: 15/920,175

(22) Filed: Mar. 13, 2018

(65) Prior Publication Data
US 2018/0266929 A1    Sep. 20, 2018

Related U.S. Application Data

(60) Provisional application No. 62/471,037, filed on Mar. 14, 2017.

(51) Int. Cl.
*G01L 5/04* (2006.01)
*G01N 9/36* (2006.01)
*G01N 9/00* (2006.01)

(52) U.S. Cl.
CPC .............. *G01N 9/36* (2013.01); *G01L 5/04* (2013.01); *G01N 9/00* (2013.01)

(58) Field of Classification Search
CPC .............. G01N 9/36; G01N 9/00; G01L 5/04
See application file for complete search history.

(56) References Cited

U.S. PATENT DOCUMENTS

| | | | | |
|---|---|---|---|---|
| 5,052,233 A | * | 10/1991 | Rantala | G01L 5/08 73/862.454 |
| 5,057,338 A | * | 10/1991 | Baucom | D06M 23/08 427/185 |
| 5,123,373 A | * | 6/1992 | Iyer | B05C 9/14 118/612 |
| 5,228,893 A | * | 7/1993 | Smithgall | C03B 37/0253 250/559.01 |
| 5,296,064 A | * | 3/1994 | Muzzy | B29C 70/20 156/166 |

(Continued)

FOREIGN PATENT DOCUMENTS

| CN | 200947079 | 9/2007 |
|---|---|---|
| CN | 203148713 | 8/2013 |

(Continued)

*Primary Examiner* — Jamel E Williams
(74) *Attorney, Agent, or Firm* — Michael Best & Friedrich LLP

(57) ABSTRACT

A method for determining a linear density of a carbon fiber tow. The method includes providing a pulse of air directed toward the carbon fiber tow, determining, via a first sensor, an air pressure of the pulse of air, and measuring, via a second sensor, a displacement of the carbon fiber tow in response to the pulse of air directed toward the carbon fiber tow. The method further includes calculating, via a controller, a linear density of the carbon fiber tow based on the air pressure and the displacement, and outputting, via the controller, the linear density.

20 Claims, 6 Drawing Sheets

(56) References Cited

U.S. PATENT DOCUMENTS

| | | | | |
|---|---|---|---|---|
| 5,436,980 | A * | 7/1995 | Weeks | B29C 70/28 |
| | | | | 356/36 |
| 5,710,432 | A * | 1/1998 | Bell | G01L 5/042 |
| | | | | 250/559.32 |
| 6,813,941 | B2 * | 11/2004 | Beuther | D21F 11/04 |
| | | | | 73/159 |
| 2007/0230721 | A1 * | 10/2007 | White | H04R 19/005 |
| | | | | 381/166 |
| 2007/0272563 | A1 * | 11/2007 | Petyt | C12Q 1/006 |
| | | | | 205/777.5 |
| 2012/0086566 | A1 * | 4/2012 | Carney | G01M 17/024 |
| | | | | 340/443 |
| 2014/0009599 | A1 * | 1/2014 | Ledford | G01N 21/8422 |
| | | | | 348/86 |
| 2014/0069893 | A1 * | 3/2014 | Bruck | F01D 5/286 |
| | | | | 219/76.14 |
| 2015/0251213 | A1 * | 9/2015 | Birmingham | B05D 1/007 |
| | | | | 427/475 |
| 2016/0322306 | A1 * | 11/2016 | Roesner | H01L 21/30655 |
| 2016/0332389 | A1 * | 11/2016 | Tachon | B29C 70/083 |
| 2018/0266811 | A1 * | 9/2018 | Koester | G01B 11/24 |

FOREIGN PATENT DOCUMENTS

| | | |
|---|---|---|
| CN | 203908901 | 10/2014 |
| CN | 205403670 U | 7/2016 |
| CN | 205748285 U | 11/2016 |
| JP | 2004294186 A | 10/2004 |
| JP | 2006265791 A | 10/2006 |
| KR | 20120077537 A | 7/2012 |

\* cited by examiner

SYSTEM AND METHOD FOR DETERMINING LINEAR DENSITY OF CARBON FIBER

RELATED APPLICATIONS

This application claims priority to U.S. Provisional Patent Application No. 62/471,037, filed Mar. 14, 2017, the entire contents of which are hereby incorporated by reference.

STATEMENT OF GOVERNMENT INTEREST

This invention was made with government support under grant number DE-EE0006926 awarded by the Department of Energy. The government has certain rights in the invention.

FIELD

Embodiments relate to determining one or more characteristics of carbon fiber, and more specifically, carbon fiber tow.

SUMMARY

Carbon fiber, and more specifically, carbon fiber tow is used in a variety of industries. Carbon fiber tow may be provided in spools having strands of carbon fiber. Carbon fiber production may be a complex process. Thus, during production, characteristics (for example, linear density) of the carbon fiber may vary.

Thus, one embodiment provides a method for determining a linear density of a carbon fiber tow. The method includes providing a pulse of air directed toward the carbon fiber tow, determining, via a first sensor, an air pressure of the pulse of air, and measuring, via a second sensor, a displacement of the carbon fiber tow in response to the pulse of air directed toward the carbon fiber tow. The method further includes calculating, via a controller, a linear density of the carbon fiber tow based on the air pressure and the displacement, and outputting, via the controller, the linear density.

Another embodiment provides a system for determining a linear density of a carbon fiber tow. The system includes an air source, a first sensor, a second sensor, and a controller. The air source is configured to direct a pulse of air toward the carbon fiber tow. The first sensor is configured to sense a pressure of the pulse of air. The second sensor is configured to sense a displacement of the carbon fiber tow in response to the pulse of air. The controller includes an electronic processor and memory. The controller is configured to receive the pressure of the pulse of air, receive the displacement of the carbon fiber tow, calculate a linear density of the carbon fiber tow based on the pressure and the displacement, and output the linear density.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
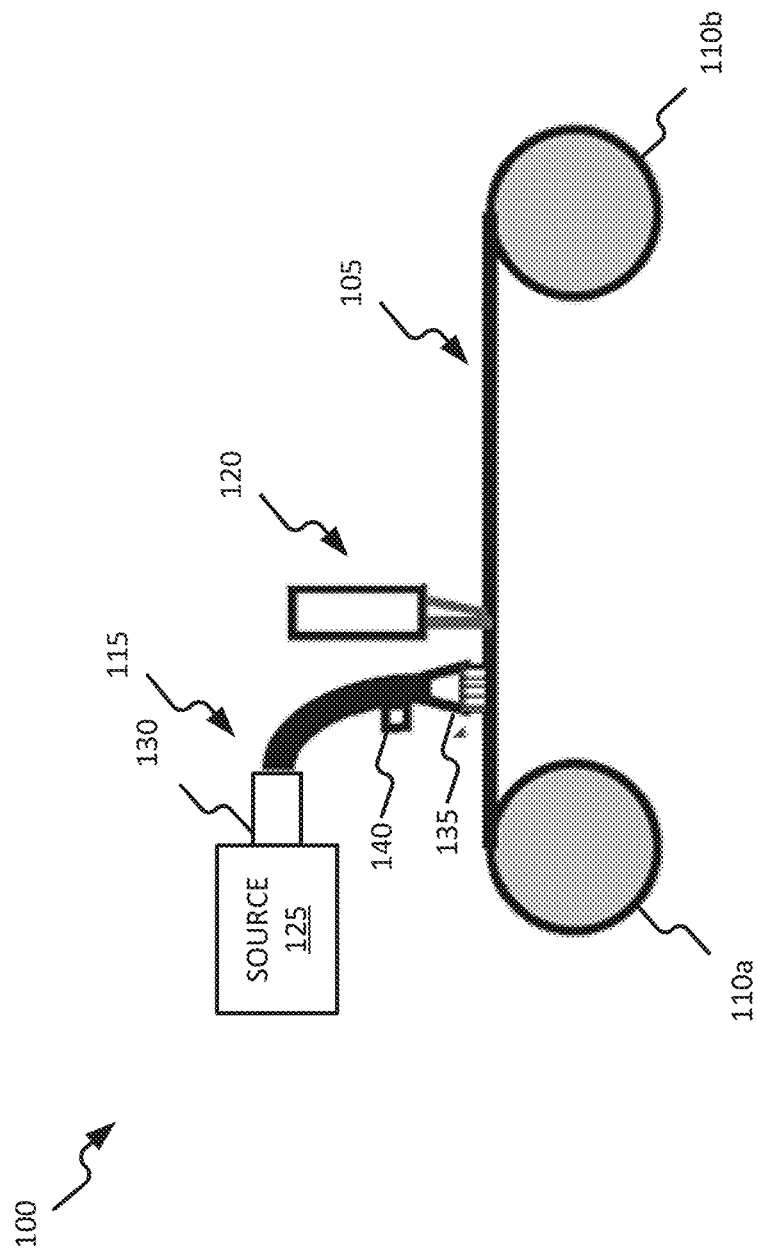
FIG. 1 is a block diagram of a system for determining one or more characteristics of carbon fiber according to some embodiments.

FIG. 1 illustrates a system 100 according to some embodiments. The system 100 is configured to determine one or more characteristics of a carbon fiber tow 105. In some embodiments, the one more characteristics include a linear density and/or a tension of the carbon fiber tow 105. In some embodiments, the carbon fiber tow 105 is 24 k carbon fiber tow. In some embodiments, the system 100 may be configured to determine one or more characteristics of poly acrylonitrile (PAN) fiber.

The system 100 may include first and second rollers 110a, 110b, an air pulse device 115, and a measurement device 120. The first and second rollers 110a, 110b are configured to roll the carbon fiber tow 105 past the air pulse device 115 and the measurement device 120.

The air pulse device 115 is configured to provide one or more pulses of air toward the carbon fiber tow 105. The air pulse device 115 may include an air source 125, a valve 130, an air output 135, and a pressure sensor 140. The air source 125 may be any known air source, including but not limited to, an air tank and an air compression. The valve 130 is configured to control the air from the air source 125 to the air output 135. The valve 130 may be an electrically-controlled valve having a variable opening speed. The air (for example, in the form of a pulse of air) may be directed toward the carbon fiber tow 105 via the air output 135. The pressure sensor 140 is configured to sense the pressure of the air directed toward the carbon fiber tow 105. In some embodiments, the pressure sensor 140 is a transducer. In other embodiments, the pressure sensor 140 may be a Pitot tube pressure sensor.

Figure 2:
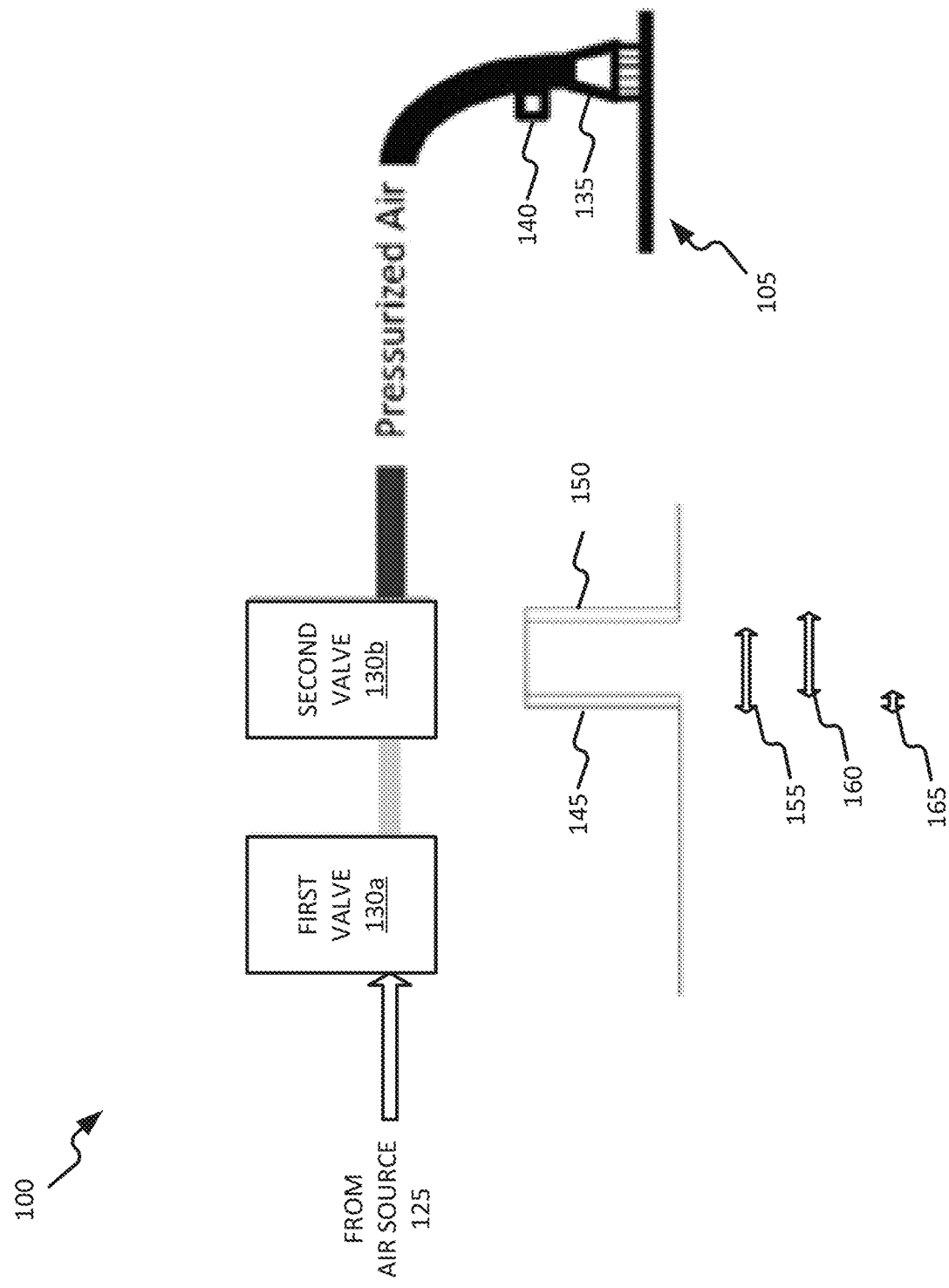
FIG. 2 is a block diagram of an air source for the system of FIG. 1 according to some embodiments.

FIG. 2 illustrates the air pulse device 115 according to some embodiments. As illustrated, the air pulse device 115 may have a first valve 130a and a second valve 130b. The pulse width, or duration, of the air pulse may be controlled by controlling an offset time of the first and second valves 130a, 130b. In some embodiments, the first valve 130a is a normally closed valve, while the second valve 130b is a normally open valve. For example, the first valve 130a may be in a normally closed position and opens upon receiving a voltage signal, while the second valve 130b may be in a normally open position and closes upon receiving a voltage signal.

In operation, pulse-width signals 145, 150 may be used to control the offset time between the first and second valves 130a, 130b, and thus the duration of the air pulse output from the air output 135. As illustrated, pulse-width signal 145 may open the normally closed first valve 130a for a first time period (illustrated as arrow 155), while pulse-width signal 150 may close the normally open second valve 130b for a second time period (illustrated as arrow 160). As a result, the duration of the air pulse output from the air output 135 may have a third time period (illustrated as arrow 165) approximately equivalent to a start time of the first time period and a start time of the second time period. Such an embodiment may allow pulses of air having a shorter duration than pulses of air provided by a single valve.

The measurement device 120 is configured to measure a displacement of the carbon fiber tow 105 in response to the carbon fiber tow 105 receiving the one or more air pulses from the air pulse device 115. The measurement device 120 may be a transducer, such as but not limited to, an ultrasonic transducer, a laser transducer, an electroacoustic transducer, and an electro-optical transducer. In some embodiments, the measurement device 120 outputs a signal (for example, an ultrasonic signal, a laser signal, etc.) toward the carbon fiber tow 105. The signal is then reflected off of the carbon fiber tow 105. The measurement device 120 receives the reflected signal to determine/sense displacement of the carbon fiber tow 105.

Figure 3:
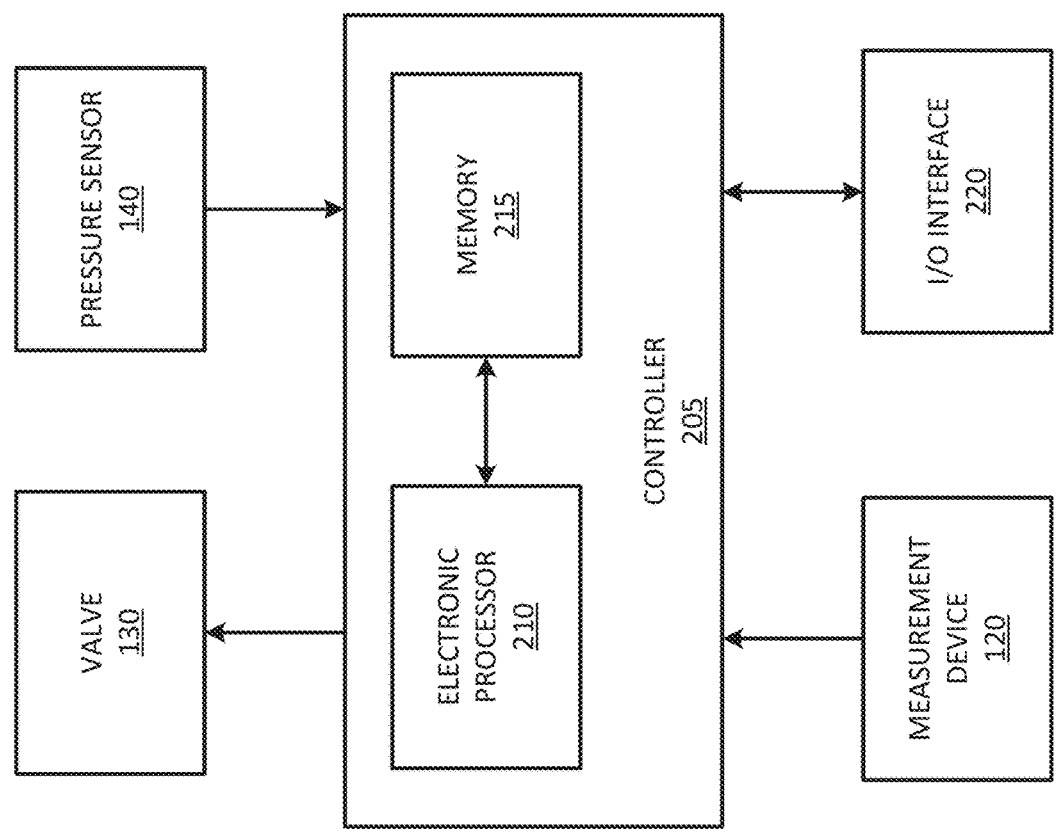
FIG. 3 is a block diagram of a control system of the system of FIG. 1 according to some embodiments

FIG. 3 is a block diagram of a control system 200 of the system 100 according to some embodiments. The control system 200 is configured to control operation of the system 100. The control system 200 includes a controller 205 that is electrically and/or communicatively connected to a variety of modules or components of the system 100. For example, the controller 205 is electrically and/or communicatively connected to the air pulse device 115 (including, but not limited to, valve 130 and pressure sensor 140) and the measurement device 120.

In some embodiments, the controller 205 includes a plurality of electrical and electronic components that provide power, operational control, and protection to the components and modules within the controller 205 and/or the system 100. For example, the controller 205 includes, among other things, an electronic processor 210 (for example, a microprocessor or another suitable programmable device) and the memory 215.

The memory 215 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 210 is communicatively coupled to the memory 215 and executes software instructions that are stored in the memory 215, or stored on another non-transitory computer readable medium such as another memory or a disc. The software may include one or more applications, program data, filters, rules, one or more program modules, and other executable instructions.

In some embodiments, the control system 200 further includes an input/output (I/O) interface 220. The I/O interface 220 provides an interface between system 100 and external devices (for example, a display, an external computer, a network, a smartphone, etc.).

In operation, controller 205 controls the air pulse device 115 by outputting one or more control signals (for example, pulse-width signals 145, 150) to valve 130 (for example, first and second valves 130a, 130b). The controller 205 may then receive one or more pressure signals from the pressure sensor 140, indicative of the pressures of one or more air pulses directed toward the carbon fiber tow 105. The controller 205 may also then receive one or more measurement signals, from the measurement device 120, indicative of the displacement of the carbon fiber tow 105. As discussed in further detail below, the controller 205 may then determine one or more characteristics of the carbon fiber tow 105 based on the pressure and measurement signals. The controller 205 may then output the one or more characteristics via the I/O interface 220.

Figure 4:
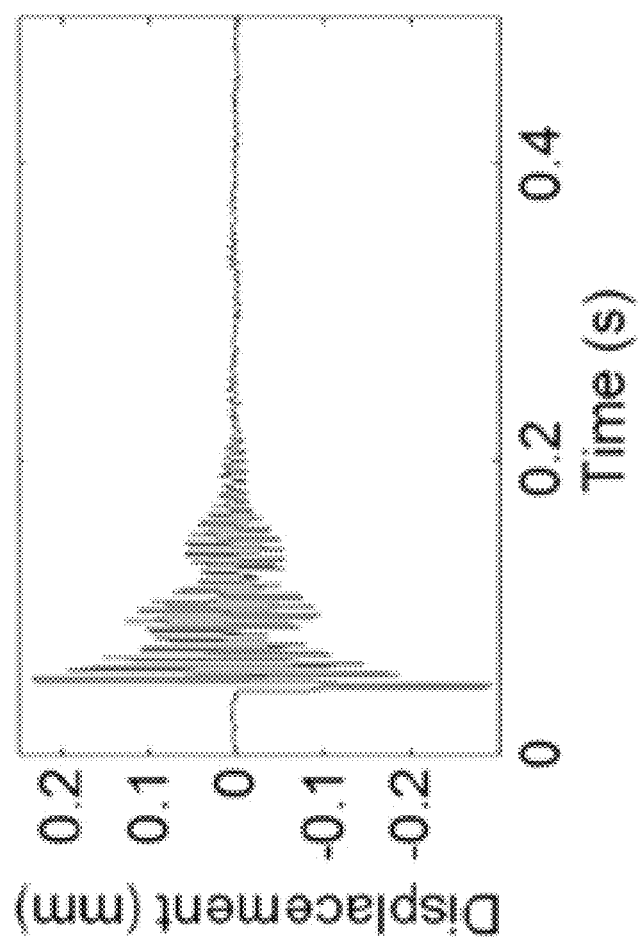
FIG. 4 is a chart illustrating a displacement of a carbon fiber tow over time.

FIG. 4 is chart 300 illustrating a displacement of the carbon fiber tow 105 over time according to some embodiments. In some embodiments, a similar chart may illustrate a pressure of the one or more air pulses directed toward the carbon fiber tow 105 over time.

Figure 5:
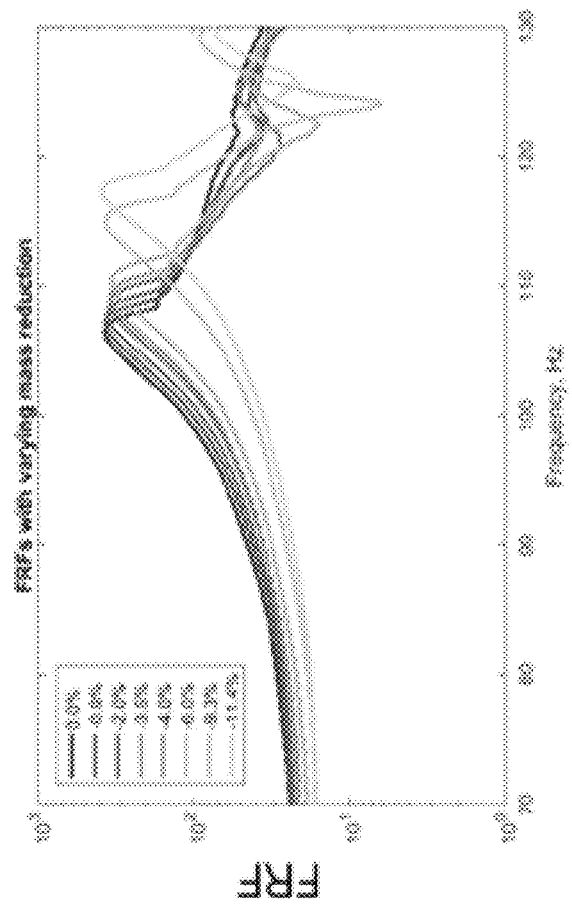
FIG. 5 is a chart illustrating one or more frequency response functions (FRFs) of the carbon fiber tow.

FIG. 5 is a chart 400 illustrating one or more frequency response functions (FRFs) of the carbon fiber tow 105. The one or more FRFs of the carbon fiber tow 105 may be calculated, by the controller 205, based on the displacement and the pressure. In some embodiments, a 0 Hz component of the FRF (FRF(0)) of the carbon fiber tow 105 is calculated. In such an embodiment, FRF(0) may then be used to determine a tension of the carbon fiber tow 105, using Equations 1. For Equation 1, L may represent the length of the tow, $x_o$ may represent the location of the excitation force (for example, the position of the air pulse device 115), x may represent the location at which the response is measured (for example, the position of the measurement device 120), FRF(0) may represent the FRF at 0 Hz, and T may represent the tension.

$$FRF(0) = \sum_{n=1}^{\infty} \frac{2L\sin\left(\frac{n\pi x_o}{L}\right)\sin\left(\frac{n\pi x}{L}\right)}{n^2\pi^2 T} \qquad [\text{Equation 1}]$$

Additionally, one or more natural frequencies of the carbon fiber tow 105 may be determined. In some embodiments, a modal parameter estimation algorithm is used to determine/identify the natural frequencies of the carbon fiber tow 105. Once the tension is known, a linear density of the carbon fiber tow 105 may be calculated using Equation 2 below, where $f_n$ is the nth natural frequency of the tow (determined using the FRF), T is the tension of the tow 105 (determined based on the FRF(0)), L is the length of the tow 105, and p is the linear density of the tow.

$$f_n = \frac{n}{2L}\sqrt{\frac{T}{\rho}} \qquad [\text{Equation 2}]$$

Figure 6:
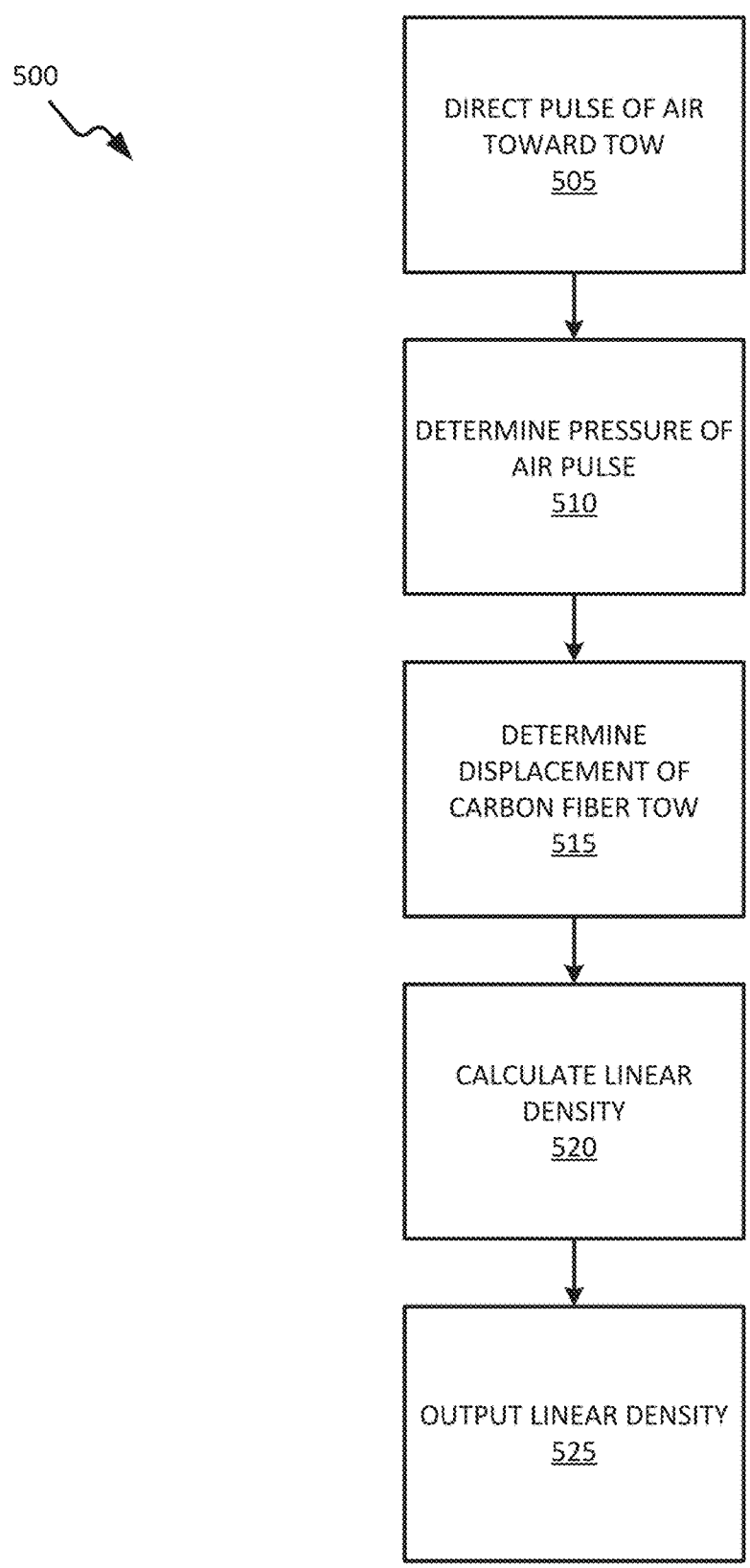
FIG. 6 is a flowchart illustrating a method or process of the system of FIG. 1 according to some embodiments.

FIG. 6 is a flowchart illustrating an operation, or process, 500 of the system 100 according to some embodiments. It should be understood that the order of the steps disclosed in process 500 could vary. In addition, other steps may be added and not all of the steps may be required. Initially, a pulse of air is directed toward the carbon fiber tow 105 (block 505). In some embodiments, the pulse of air is provided by the air pulse device 115 at a predetermined position. A pressure of the pulse of air directed toward the carbon fiber tow 105 is then determined (block 510). In some embodiments, the pressure is determined via a first sensor (for example, pressure sensor 140). A displacement of the carbon fiber tow 105 in response to the pulse of air is then determined (block 515). In some embodiments, the displacement is determined via a second sensor (for example, measurement device 120). A linear density of the carbon fiber tow 105 is determined based on the pressure and the displacement (block 520). In some embodiments, the linear density is determined by controller 205. In some embodiments, the linear density is determined based on a calculated frequency response function (FRF) of the carbon fiber tow 105. In some embodiments, the linear density is determined by controller 205. The linear density may then be output (block 525).

Thus, the invention provides, among other things, a system and method for determining a linear density of a carbon fiber tow. Various features and advantages of the invention are set forth in the following claims.

What is claimed is:

1. A method for determining a linear density of a carbon fiber tow, the method comprising:
providing a pulse of air directed toward the carbon fiber tow;
determining, via a first sensor, an air pressure of the pulse of air;
measuring, via a second sensor, a displacement of the carbon fiber tow in response to the pulse of air directed toward the carbon fiber tow;
calculating, via a controller, a linear density of the carbon fiber tow based on the air pressure and the displacement; and
outputting, via the controller, the linear density.

2. The method of claim 1, further comprising:
determining, via the controller, a frequency response function (FRF) based on the air pressure and the displacement.

3. The method of claim 2, wherein the linear density of the carbon fiber tow is based on the frequency response function (FRF).

4. The method of claim 3, wherein a tension of the carbon fiber tow is determined using the following equation.

$$FRF(0) = \sum_{n=1}^{\infty} \frac{2L\sin\left(\frac{n\pi x_o}{L}\right)\sin\left(\frac{n\pi x}{L}\right)}{n^2\pi^2 T}$$

5. The method of claim 1, wherein the linear density of the carbon fiber two is further based on first natural frequency of the carbon fiber tow.

6. The method of claim 1, further comprising:
calculating, via the controller, a tension of the carbon fiber tow.

7. The method of claim 1, wherein the first sensor is a pressure transducer.

8. The method of claim 1, wherein the second sensor is a laser displacement transducer.

9. The method of claim 1, wherein the pulse of air is provided by a first valve and a second valve.

10. The method of claim 1, wherein linear density of the carbon fiber tow is based on at least one selected from the group consisting of a position of the pulse of air directed toward the carbon fiber tow and a position of the second transducer.

11. A system for determining a linear density of a carbon fiber tow, the system comprising:
an air source configured to direct a pulse of air toward the carbon fiber tow;
a first sensor configured to sense a pressure of the pulse of air;
a second sensor configured to sense a displacement of the carbon fiber tow in response to the pulse of air; and
a controller including an electronic processor and memory, the controller configured to:
receive the pressure of the pulse of air,
receive the displacement of the carbon fiber tow,
calculate a linear density of the carbon fiber tow based on the pressure and the displacement, and
output the linear density.

12. The system of claim 11, wherein the controller is further configured to:
determine a frequency response function (FRF) based on the air pressure and the displacement.

13. The system of claim 12, wherein the linear density of the carbon fiber tow is based on the frequency response function (FRF).

14. The system of claim 13, wherein a tension of the carbon fiber tow is determined using the following equation.

$$FRF(0) = \sum_{n=1}^{\infty} \frac{2L\sin\left(\frac{n\pi x_o}{L}\right)\sin\left(\frac{n\pi x}{L}\right)}{n^2\pi^2 T}$$

15. The system of claim 11, wherein the linear density of the carbon fiber tow is further based on first natural frequency of the carbon fiber tow.

16. The system of claim 11, wherein the controller is further configured to:
calculate a tension of the carbon fiber tow.

17. The system of claim 11, wherein the first sensor is a pressure transducer.

18. The system of claim 11, wherein the second sensor is a laser displacement transducer.

19. The system of claim 11, wherein the pulse of air is provided by a first valve and a second valve.

20. The system of claim 11, wherein linear density of the carbon fiber tow is based on at least one selected from the group consisting of a position of the pulse of air directed toward the carbon fiber tow and a position of the second transducer.

* * * * *